(12) United States Patent
Bhatt et al.

(10) Patent No.: US 11,476,647 B1
(45) Date of Patent: Oct. 18, 2022

(54) MAINTENANCE GROUNDING DEVICE IN MOTOR CONTROL CENTER WITH INTEGRATED INTERLOCK SYSTEM

(71) Applicant: Rockwell Automation Technologies, Inc., Mayfield Heights, OH (US)

(72) Inventors: Navinchandra Bhatt, Mississauga (CA); Paul van Heeswyk, Cambridge (CA); John Kay, Kitchener (CA); Ashwin Baliga B, Bengaluru (IN)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 17/237,744

(22) Filed: Apr. 22, 2021

(51) Int. Cl.
   *H02B 11/133* (2006.01)
   *H02B 11/04* (2006.01)
   (Continued)

(52) U.S. Cl.
   CPC ............ *H02B 13/005* (2013.01); *H01H 9/26* (2013.01); *H02B 1/30* (2013.01); *H02B 11/04* (2013.01); *H02B 11/133* (2013.01)

(58) Field of Classification Search
   CPC ........ H02B 11/04; H02B 11/133; H01H 9/26; H01H 2009/265
   See application file for complete search history.

(56) References Cited

U.S. PATENT DOCUMENTS 2,358,146 A * 9/1944 Clute ................... H01H 33/52
74/96
2,364,974 A * 12/1944 Harlow ................. H01H 9/52
200/293

(Continued)

FOREIGN PATENT DOCUMENTS

CN 104319131 A * 1/2015 ............... H01H 9/20
CN 104319132 A * 1/2015 ............... H01H 9/22
(Continued)

OTHER PUBLICATIONS

Brochure titled "Adding additionasl layers of personnel safety to UL 347 Motor Control Centers", Rockwell Automation Publication MCC-WP003A-EN-P, Aug. 2021, 13 pages. (Year: 2021).*

(Continued)

*Primary Examiner* — Robert J Hoffberg
(74) *Attorney, Agent, or Firm* — Fay Sharpe LLP

(57) ABSTRACT

A motor control center includes an enclosure comprising an isolation switch, a main contactor device, and a ground switch device. The isolation switch is selectively manually operable between a connected state and a disconnected state. In the connected state the isolation switch is adapted to conduct electrical power from an associated power source to the main contactor device and wherein the isolation switch in the disconnected state interrupts conduction of electrical power from the associated power source to the main contactor device. The main contactor device is selectively operable between a conductive state and a non-conductive state, wherein the main contactor device is adapted to electrically connect the isolation switch to the ground switch device and to an associated electrical load when the main contactor device is in its conductive state and wherein the main contactor device disconnects said isolation switch from the ground switch device and the associated electrical load when the main contactor device is in its non-conductive state. The ground switch device is manually operable from an open, ungrounded state in which the main contactor device is electrically disconnected from a ground path to a closed, grounded state in which the main contactor device is electrically connected to the ground path. The motor control center further includes a first interlock device operably connected between the isolation switch and the ground switch device, wherein the first interlock device prevents (Continued)

movement of the isolation switch from the disconnected state to the connected state when the ground switch device is in the grounded state.

20 Claims, 11 Drawing Sheets

(51) Int. Cl.
*H01H 9/26* (2006.01)
*H02B 13/00* (2006.01)
*H02B 1/30* (2006.01)

(56) References Cited

U.S. PATENT DOCUMENTS

| | | | | |
|---|---|---|---|---|
| 5,796,060 A * | 8/1998 | Fuchsle | | H02B 13/035 |
| | | | | 361/612 |
| 6,329,615 B1 | 12/2001 | Biquez | | |
| 6,512,669 B1 * | 1/2003 | Goodwin | | H02B 13/025 |
| | | | | 361/616 |
| 6,727,442 B2 * | 4/2004 | Byron | | H01H 31/003 |
| | | | | 200/400 |
| 7,130,172 B2 * | 10/2006 | Inami | | H01H 33/52 |
| | | | | 361/64 |
| 7,140,702 B2 * | 11/2006 | Byron | | H02B 1/28 |
| | | | | 312/283 |
| 7,968,809 B2 * | 6/2011 | Hauke | | H02B 11/133 |
| | | | | 200/50.33 |
| 8,027,152 B1 * | 9/2011 | Betz | | H01H 33/122 |
| | | | | 361/620 |
| 10,734,171 B2 * | 8/2020 | Huo | | H01H 9/285 |
| 10,931,140 B2 * | 2/2021 | Hadler-Jacobsen | | H02J 3/02 |
| 2009/0141430 A1 * | 6/2009 | Jung | | H01H 33/6661 |
| | | | | 361/612 |

FOREIGN PATENT DOCUMENTS

| | | | | | |
|---|---|---|---|---|---|
| CN | 104319163 A | * | 1/2015 | | H01H 33/66 |
| CN | 104319164 A | * | 1/2015 | | |
| CN | 105140064 A | * | 12/2015 | | |
| CN | 105406386 A | * | 3/2016 | | |
| CN | 105470036 A | * | 4/2016 | | |
| CN | 105742091 A | * | 7/2016 | | |
| CN | 106024453 A | * | 10/2016 | | H01H 9/26 |
| CN | 106098436 A | * | 11/2016 | | |
| CN | 106449233 A | * | 2/2017 | | H01H 3/00 |
| CN | 106449234 A | * | 2/2017 | | |
| CN | 106531500 A | * | 3/2017 | | |
| CN | 106548885 A | * | 3/2017 | | H01H 9/16 |
| CN | 107210148 A | * | 9/2017 | | H01H 3/46 |
| CN | 107507716 A | * | 12/2017 | | H01H 9/26 |
| CN | 107665783 A | * | 2/2018 | | H01H 9/22 |
| CN | 107785207 A | * | 3/2018 | | |
| CN | 107808788 A | * | 3/2018 | | H01H 9/22 |
| CN | 108376628 A | * | 8/2018 | | |
| CN | 108461332 A | * | 8/2018 | | |
| CN | 108511256 A | * | 9/2018 | | |
| CN | 108831779 A | * | 11/2018 | | H01H 9/22 |
| CN | 109524257 A | * | 3/2019 | | H01H 9/26 |
| CN | 110211826 A | * | 9/2019 | | |
| CN | 110911191 A | * | 3/2020 | | H01H 9/26 |
| CN | 111091998 A | * | 5/2020 | | |
| CN | 111146026 A | * | 5/2020 | | |
| CN | 111162461 A | * | 5/2020 | | |
| CN | 111192775 A | * | 5/2020 | | H01H 9/26 |
| CZ | 6336 U1 | | 7/1997 | | |
| KR | 20140057966 A | * | 5/2014 | | H01H 33/52 |

OTHER PUBLICATIONS

Brochure titled "CENTERLINE 400 a One-High Cabinet, Standard and Arc Resistant Enclosure, User Manual", Rockwell Automation Publication 1512A-UM100H-EN-P, Dec. 2021, 104 pages (Year: 2021).*
Rockwell Automation Press Release, New CENTERLINE 1500 Motor Control Center Grounding Device Helps Increase Safety, Aug. 16, 2021, 1 page (Year: 2021).*
Brochure titled "CENTERLINE 1500 Medium Voltage Motor Control Centers", Rockwell Automation Publication 1500-SG001D-EN-P, published Jul. 2019.
Brochure titled "Medium Voltage Motor Controllers", Rockwell Automation Publication 1500-SR020I-EN-P, published Oct. 2014.
Brochure titled "CENTERLINE 600 a One-High Cabinet, Standard and Arc-Resistant Enclosure", Rockwell Automation Publication 1512A-UM101A-EN-P, published Oct. 2018.
Brochure titled "Prosafe Dual Kay Rotary Key Switches", Rockwell Automation Publication Drg. No. 7200184 Issue 1, published Feb. 2011.
Brochure titled "Safety Switches", Rockwell Automation Publication GLSAFE-BR002A-EN-P, published Feb. 2014.
Extended European Search Report dated Aug. 31, 2022 for EP Application No. 22 16 8790.

* cited by examiner

MAINTENANCE GROUNDING DEVICE IN MOTOR CONTROL CENTER WITH INTEGRATED INTERLOCK SYSTEM

BACKGROUND INFORMATION

Motor control centers (MCC) for distributing electrical power to electric motors are well known in the art. Such motor control centers are connected to a source electrical power, typically three-phase AC power. A main contactor within the MCC is operable to selectively conduct the electrical power to a load such as one or more motors or disconnect the electrical power from the load. Motor control centers also include an isolation switch or "isolator" located electrically upstream relative to the main contactor. The isolator is manually operated by an isolation switch handle. When the isolation switch handle is moved to the open (off) position (typically a "down" position), the isolation switch is opened to disconnect the main contactor and other downstream components of the motor control center from the incoming source of electrical power. When the handle is moved to the closed (on) position (typically an "up" position), the isolation switch is closed to connect the main contactor and other downstream components to the source of electrical power.

During maintenance of such motor control centers, it is desirable for maintenance personnel to ground (earth) the main contactor and other components within the motor control center. A ground switch is provided for this purpose. The ground switch is selectively operable between a closed or "grounded" position in which it connects the main contactor to a ground path and an opened or "ungrounded" position in which the ground switch opens the ground path circuit to disconnect the main contactor from the ground path.

It is necessary for safe operation of the motor control center to prevent operation of the ground switch from its opened position to its closed position when the isolation switch is in its closed condition which could lead to a dangerous and damaging short circuit condition. For the same reason, it necessary to prevent operation of the isolation switch from its opened position to its closed position when the ground switch is already in its closed position. To prevent the condition of both the ground switch and the isolator switch from being in a conductive state simultaneously, known motor control centers include a key-based interlock device that uses the same single key for unlocking (allowing operation of) the isolator switch and the ground switch. The key is captured in the key interlock device when the interlock is in its unlocked condition, which prevent a user from closing the isolator switch when the ground switch is already closed and vice versa.

While generally safe and effective, these key-based interlock systems are suboptimal in the sense that a key can be lost, an operator must perform additional steps, and there is no safety redundancy in the sense that if the key interlock malfunctions or is otherwise able to be improperly unlocked, the undesired condition of both the ground switch and isolator switching being in a closed state simultaneously can occur. As such, a need has been identified for a new and improved ground switch interlock system for a motor control center and other industrial electrical equipment that overcomes the above deficiencies and others associated with known key-based interlock devices while providing superior overall results.

BRIEF DESCRIPTION

In accordance with one aspect of the present development, a motor control center includes an enclosure comprising an isolation switch, a main contactor device, and a ground switch device. The isolation switch is selectively manually operable between a connected state and a disconnected state, wherein said isolation switch in said connected state is adapted to conduct electrical power from an associated power source to the main contactor device and wherein the isolation switch in the disconnected state interrupts conduction of electrical power from the associated power source to the main contactor device. The main contactor device is selectively operable between a conductive state and a non-conductive state, wherein the main contactor device is adapted to electrically connect the isolation switch to the ground switch device and to an associated electrical load when the main contactor device is in its conductive state and wherein the main contactor device disconnects said isolation switch from the ground switch device and the associated electrical load when the main contactor device is in its non-conductive state. The ground switch device is manually operable from an open, ungrounded state in which the main contactor is electrically disconnected from a ground path to a closed, grounded state in which the main contactor is electrically connected to the ground path. The motor control center further includes a first interlock device operably connected between the isolation switch and the ground switch device, wherein the first interlock device prevents movement of the isolation switch from the disconnected state to the connected state when the ground switch device is in the grounded state.

In accordance with another aspect of the present disclosure, an interlock system for electrical equipment includes an isolation switch selectively manually operable between a connected state and a disconnected state, wherein the isolation switch in its connected state is adapted to conduct electrical power and wherein the isolation switch in its disconnected state interrupts conduction of electrical power. A handle is operably connected to the isolation switch and is movable between an "off" position corresponding to the disconnected state of the isolation switch and an "on" position corresponding to the connected state of the isolation switch. A ground switch device is manually operable from an open, ungrounded state in which the main isolation switch is electrically disconnected from a ground path to a closed, grounded state in which the isolation switch is electrically connected to the ground path. An interlock plunger is operably connected to the handle through an interlock linkage and movable to and between a retracted position corresponding to the "off" position of the handle and an extended position corresponding to the "on" position of the handle. The interlock plunger blocks movement of the ground switch device from its open, ungrounded state to its closed, grounded state when the interlock plunger is in its extended position.

DETAILED DESCRIPTION

Figure 1:
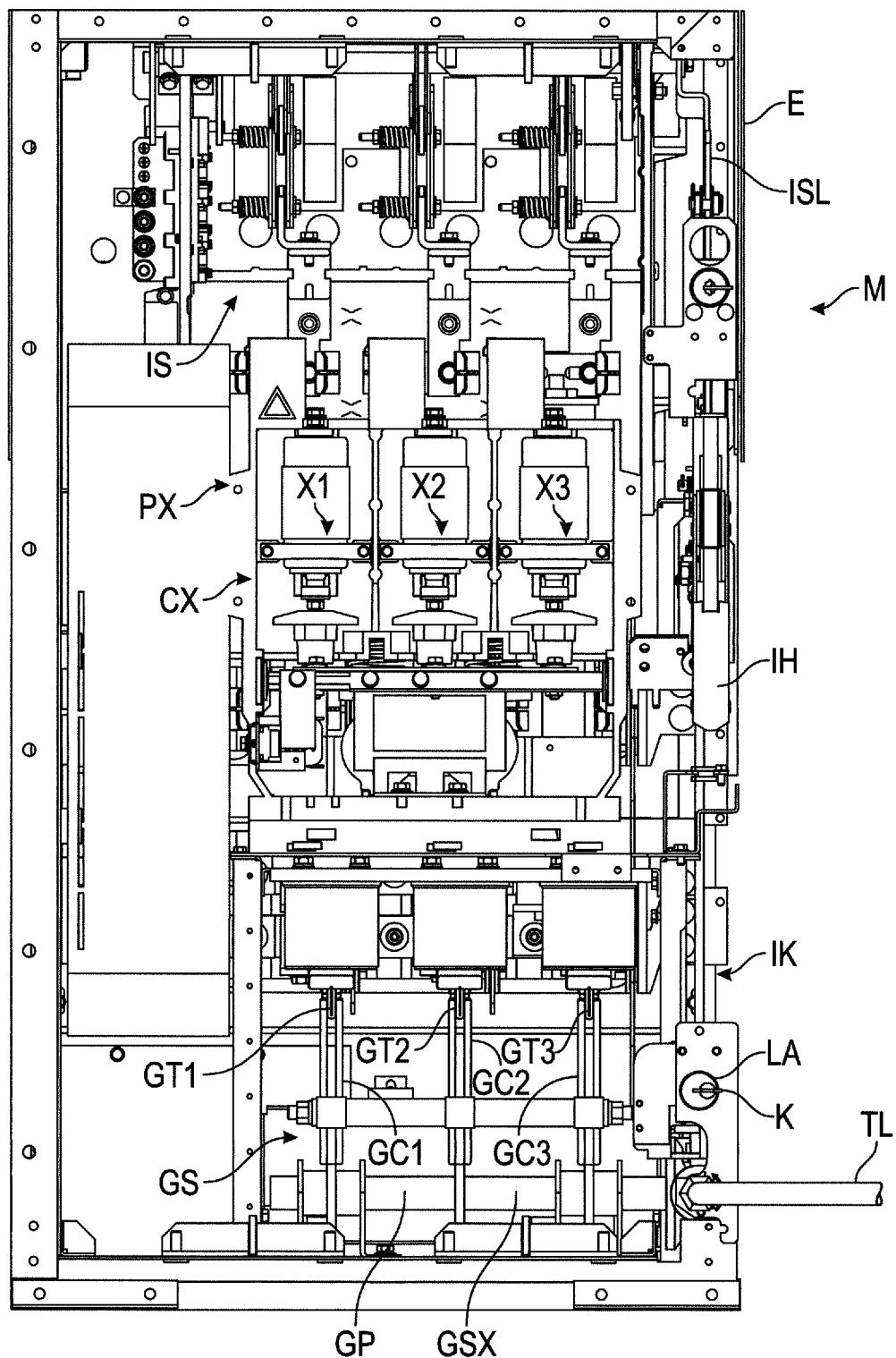
FIG. 1 is a front view of a motor control center including an integrated interlock system according to an embodiment of the present invention.
Figure 2:
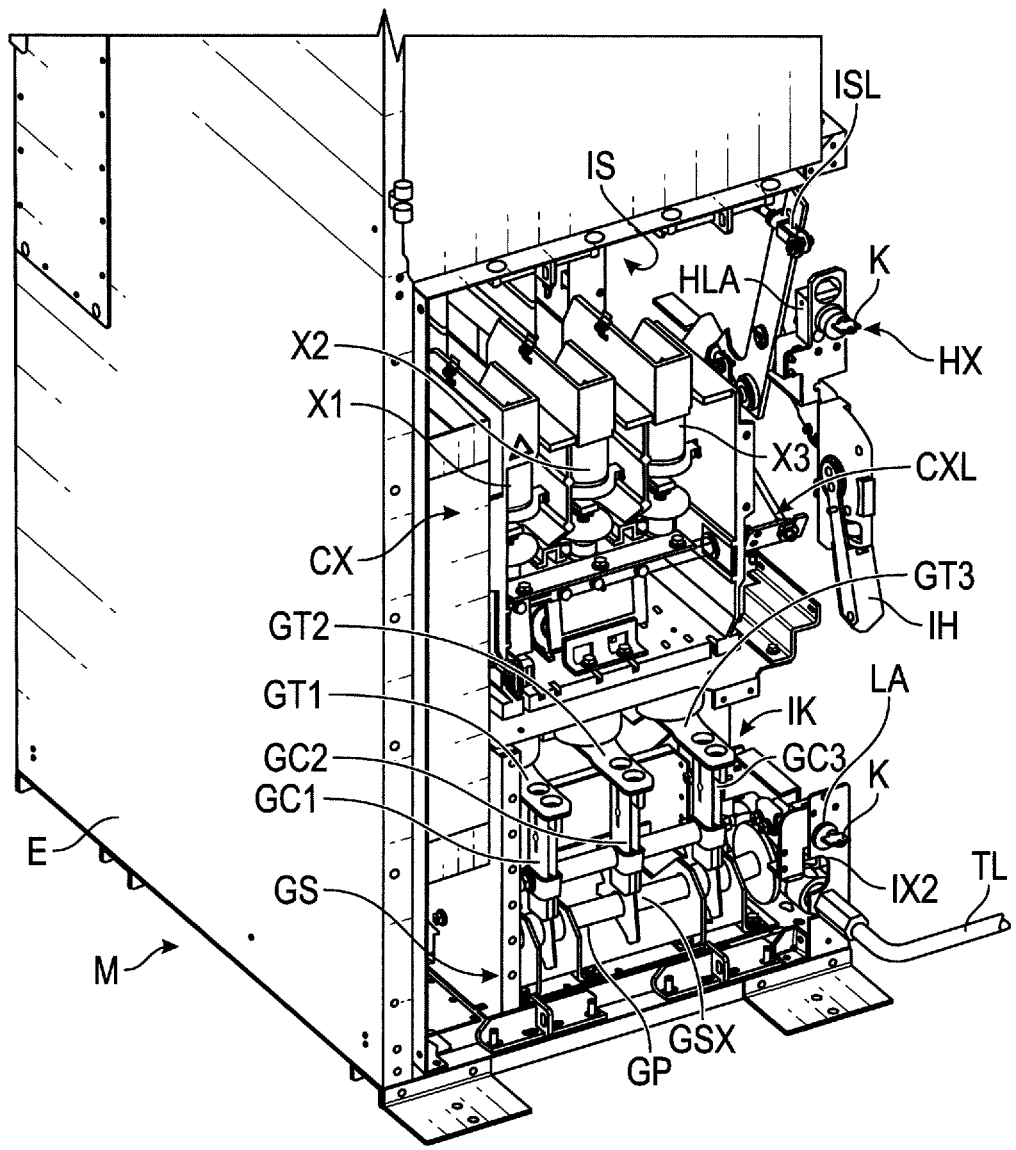
FIG. 2. is an isometric view of the motor control center of FIG. 1.

FIG. 1. is a front plan view of an or motor control center M or "MCC" with certain panels and components removed for clarity, including an integrated ground switch interlock system IK according to an embodiment of the present development. FIG. 2 is an isometric view of the motor control center M. With reference to both FIG. 1 and FIG. 2, the motor control center M comprises a cabinet or enclosure E that contains power switching and power distribution components PX for powering one or more loads such as one or more motors or the like. More particularly, the MCC includes an isolation switch IS (sometimes referred to as an "isolator switch" or "isolator") used to selectively connect and disconnect (isolate) the MCC from a source of electrical power such as three-phase AC power provided via terminals T (see FIG. 5).

The isolator IS comprises and/or is operably connected to an isolator handle IH through which an operator manually controls the operative state of the isolation switch IS. The isolator handle IH pivots between at least a first or "off" position (typically pivoted downward a maximum extent) as shown where the isolator switch IS is opened and disconnected from the incoming power terminals T (a disconnected state) and a second or "on" position (typically pivoted upward a maximum extent) where the isolator switch IS is closed or connected to the incoming power terminals T (a connected state). The isolator handle IH is operably mechanically connected to the isolator switch IS through an isolator switch linkage ISL that opens and closes the isolator IS in response to movement of the handle IH between its first and second operative positions.

The motor control center M further comprises a main contactor device CX that is electromechanically or otherwise operable to selectively conduct electrical power from the source terminals T to an associated motor or other load (a closed or conductive state) or to disconnect the motor or other load from the electrical power supplied by terminals T (an opened or non-conductive state). The main contactor device CX comprises a plurality of contactors corresponding in number to the number of power phases (i.e., three contactors X1,X2,X3 for three-phase power) electrically connected (when the isolator IS is closed) on an input side to the power terminals T and that are connected or adapted to be connected on an output side or "load side" to the motor(s) or other load(s) LD (FIG. 5) being powered. When the main contactor CX is in its conductive state, the contactors X1-X3 are closed and conduct electrical power from the isolation switch IS to the motor(s) or other load LD. When the main contactor CX is in its non-conductive state, the contactors X1-X3 are open and interrupt the flow of electrical power from the isolation switch IS to the motor(s) or other load LD. As is generally known in the art, a contactor interlock linkage CXL is provided between the isolator handle and the main contactor device CX to ensure at least that the isolator switch IS cannot be opened or closed when the main contactor device CX is in its closed (conducting) state.

Figure 3A:
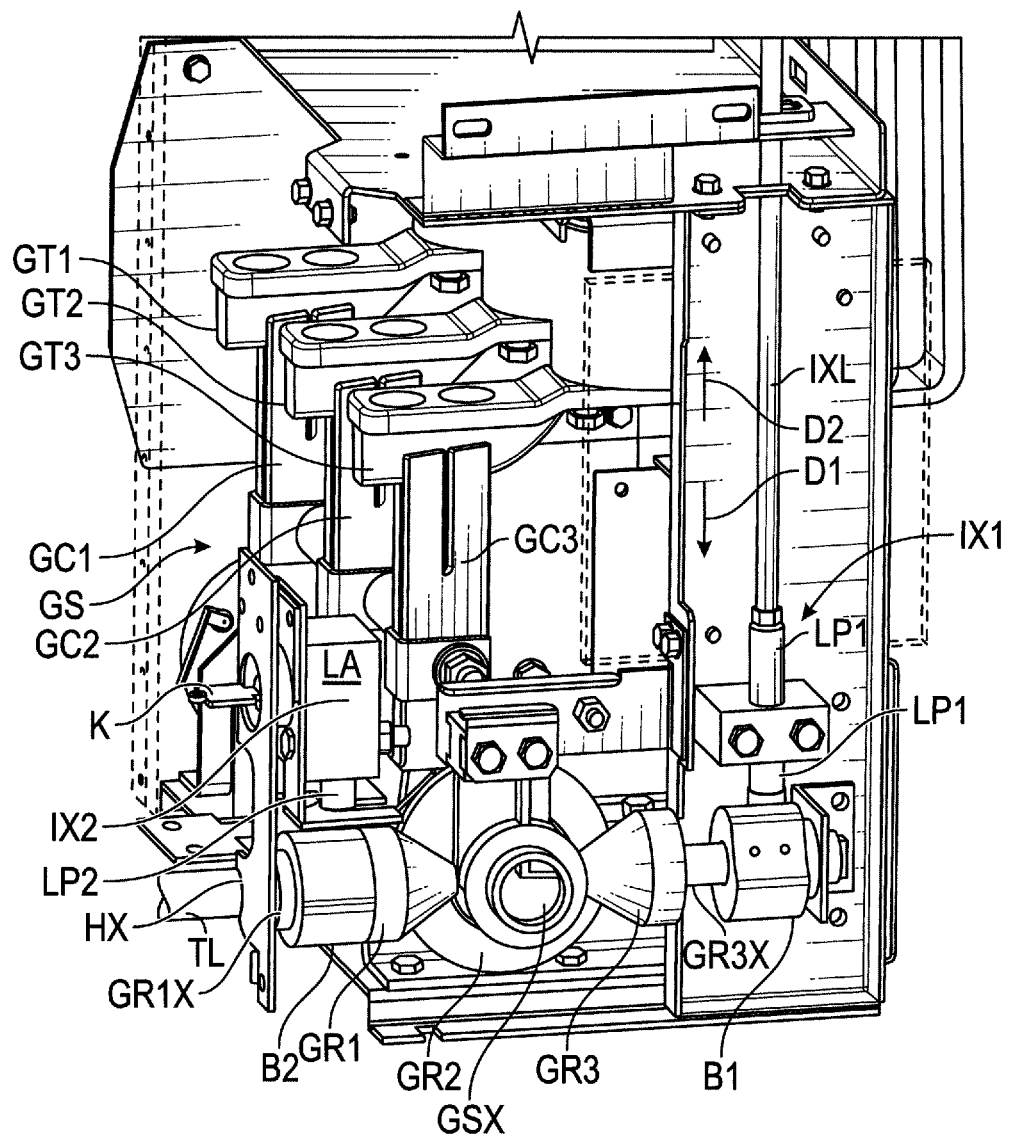
FIG. 3A is a partial isometric view of the motor control center of FIGS. 1 & 2 that shows the isolator ground switch interlock device that is part of the integrated interlock system, wherein the ground switch device is shown in its closed or grounded (conductive) state and the isolator ground switch interlock is shown in its unlocked (disengaged) condition or state.
Figure 3B:
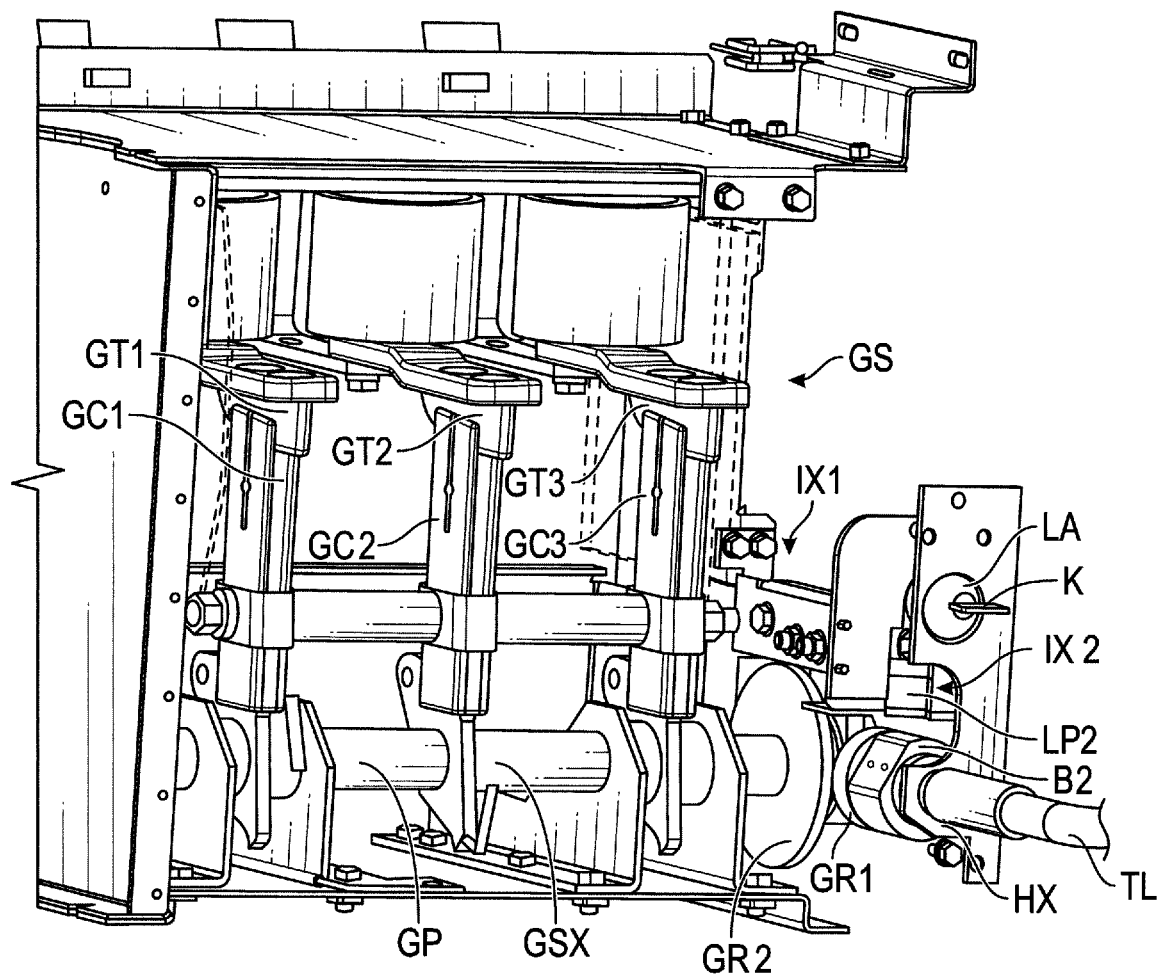
FIG. 3B is similar to FIG. 3A but shows the isolator ground switch interlock device from another perspective.
Figure 3C:
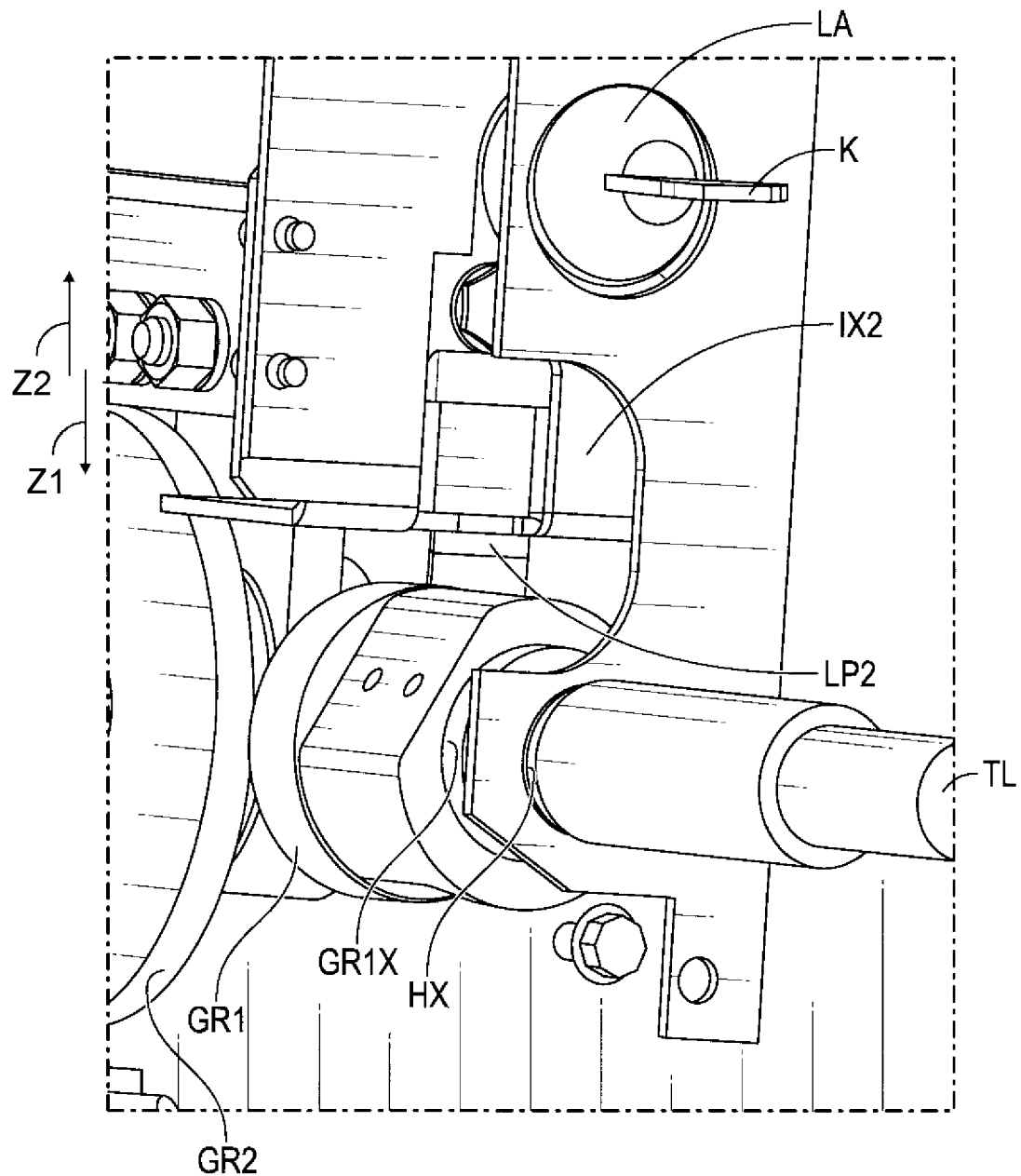
FIG. 3C is an enlarged partial view of a key interlock device that can optionally form part of the integrated interlock system of the present development, with the key interlock device shown in its unlocked (disengaged) state.
Figure 3D:
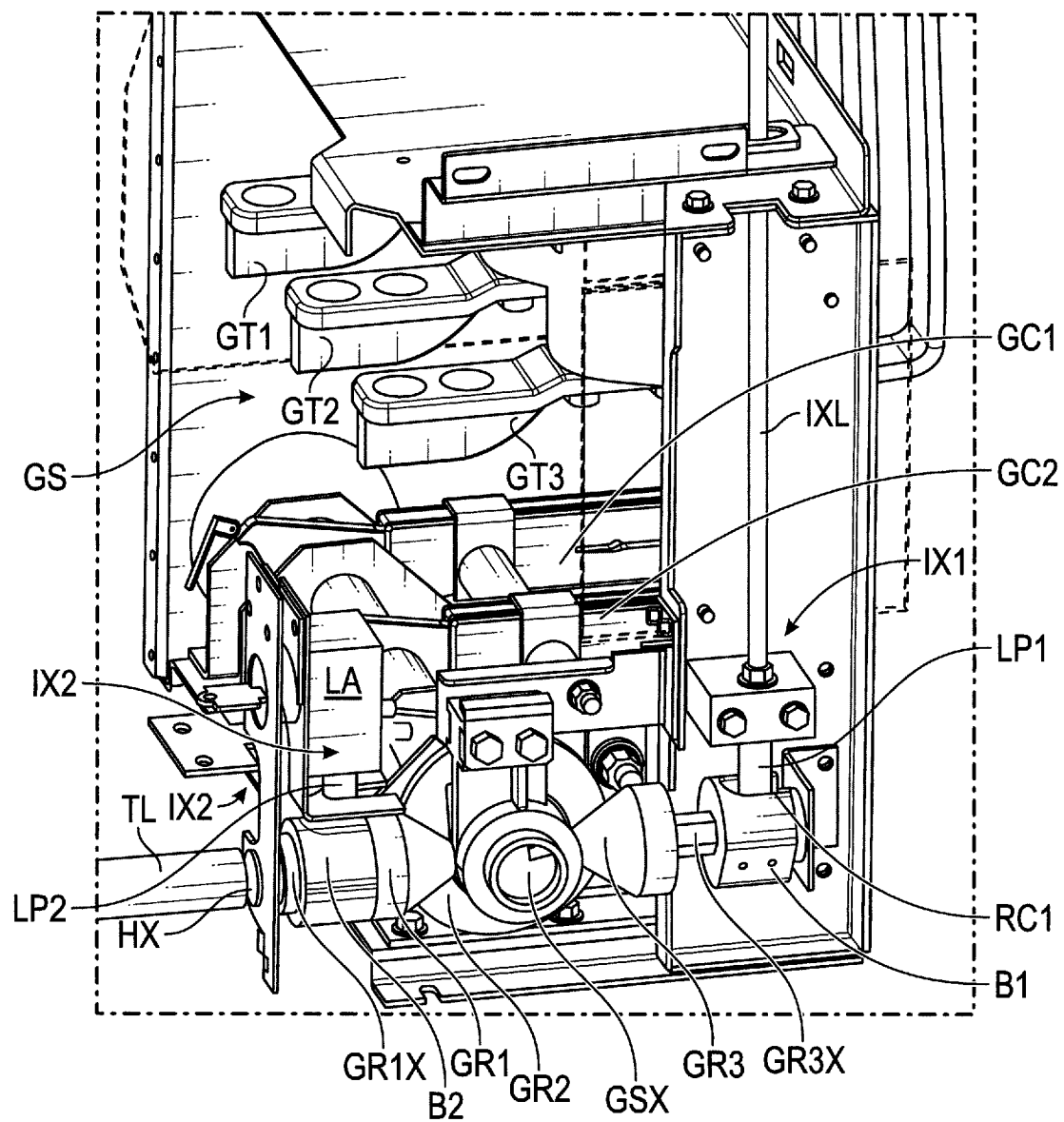
FIG. 3D is similar to FIG. 3A but shows the ground switch device in its opened or ungrounded (non-conductive) state and shows the ground switch interlock device in its locked (engaged) condition or state.
Figure 3E:
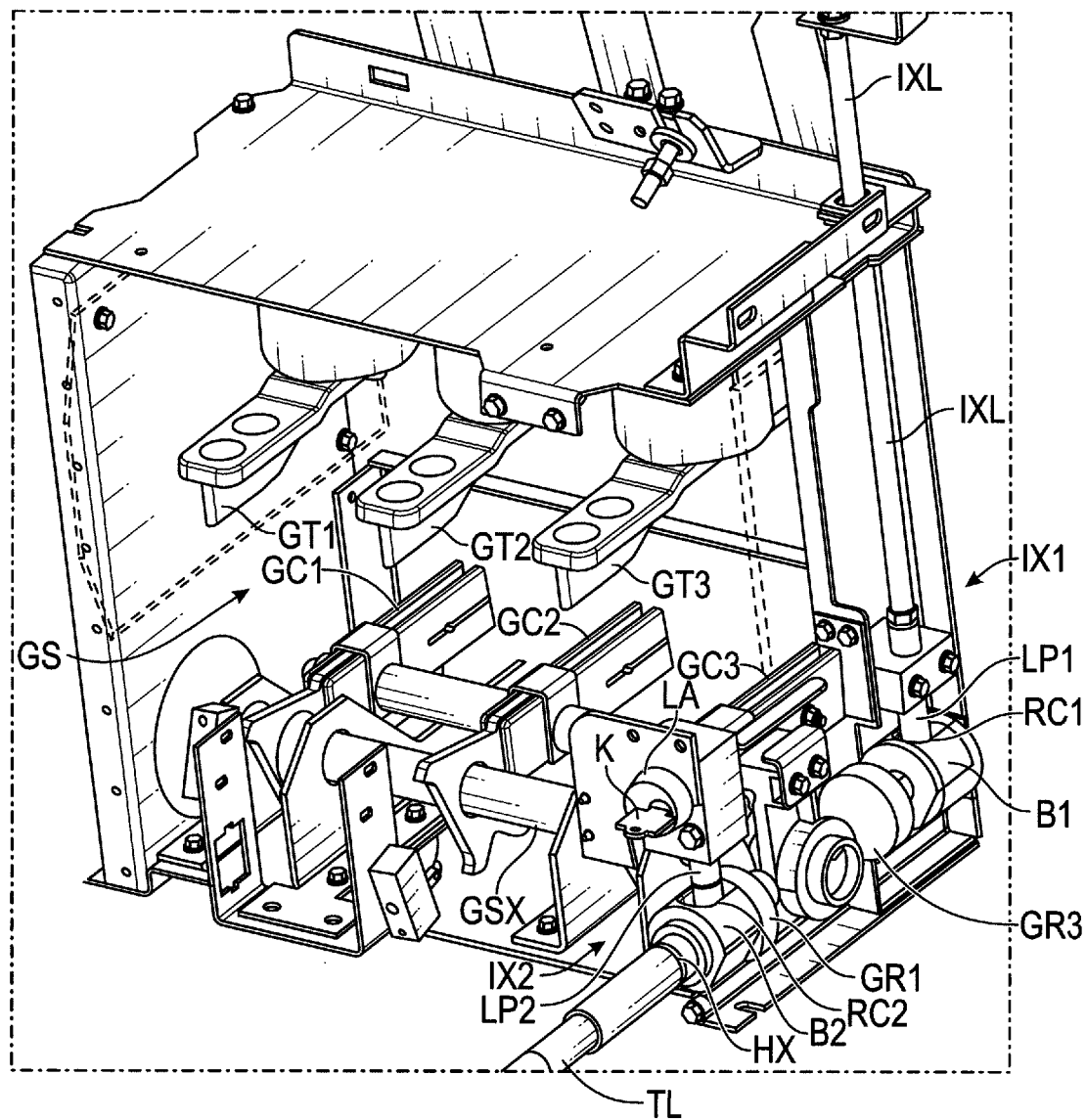
FIG. 3E is similar to FIG. 3D but shows the isolator ground switch interlock device from a different perspective (and also shows the key interlock device in its locked (engaged) state).

The motor control center M also comprises a ground switch or ground switch device GS that is selectively manually operable to connect the load side of the main contactor CX (i.e., the load side of the contactors X1-X3 of the main contactor CX) to a ground path GP (FIG. 5) to discharge voltage from the motor control center for safety. The ground switch GS is shown separately in FIGS. 3A-3F and comprises at least one and typically a plurality of ground terminals GT (GT1-GT3), equal in number and respectively electrically connected to the load side of the contactors X1-X3. The ground switch GS also comprises at least one and typically a plurality of ground switch contacts GC (GC1,GC2,GC3) equal in number to the ground terminals GT1-GT3. When the ground switch GS is closed (a "grounded state" as shown in FIGS. 3A & 3B), the ground switch contacts GC1-GC3 contact and electrically connect respectively with the ground terminals GT1-GT3 to connect the ground terminals GT1-GT3 (and the associated contactor X1-X3 to which they are respectively connected) to the ground path GP. When the ground switch GS is opened (an "ungrounded state" as shown in FIGS. 3D & 3E), the ground switch contacts GC1-GC3 separate respectively from the ground terminals GT1-GT3 to disconnect the ground terminals GT1-GT3 (and the associated contactor X1-X3 to which they are respectively connected) from the ground path GP.

With continuing reference particularly to FIGS. 3A-3F, it can be seen that the ground switch GS comprises a rotatable ground shaft GSX that is connected to the ground path GP. The ground switch contacts GC1-GC3 are connected to and rotate with the ground shaft GSX. Rotation of the ground shaft GSX in a first angular direction moves the ground switch contacts GC1-GC3 into contact with the respective ground terminals GT1-GT3 for connection to and completion of the ground path GP. Rotation of the ground shaft GSX in an opposite, second angular direction separates the ground switch contacts GC1-GC3 from the respective ground terminals GT1-GT3 to open or interrupt the ground path GP.

The ground shaft GSX is manually rotatable using a wrench or other tool TL that is removably connected to a rotatable torque input head HX. The torque input head HX is connected to and rotates with an input gear GR1 that is drivingly engaged with the ground shaft GSX such that manually rotation of the torque input head HX in first and second directions correspondingly rotates the input gear GR1 and also the ground shaft GSX in first and second angular directions. As shown herein the input gear GR1 is non-rotatably connected to an input shaft GR1X that is rotatably supported relative to the enclosure E, and the torque input head HX is non-rotatably connected to and/or forms a part of the input shaft GR1X. In the illustrated embodiment, a main gear GR2 such as a bevel gear is non-rotatably connected to the ground shaft GSX and is engaged with the input gear GR1 which acts as a pinion gear to drive the main gear GR2 and ground shaft GSX in the first and second angular directions to open and close the ground contacts GC1-GC3. The ground switch device GS further comprises an output gear or driven gear GR3 that is drivingly engaged with the main gear GR2 and that rotates in first and second opposite directions in response to rotation of the main gear GR2. In particular, the driven gear GR3 rotates in opposite directions as compared to the input gear GR1 such that the driven gear GR3 rotates in second and first opposite directions when the input gear GR1 rotates in first and second directions, respectively. The gears GR1-GR3 define a ground switch device gear train.

The ground switch GS comprises at least one and optionally first and second interlock devices for preventing closing of the ground switch contacts GC1-GC3 when the isolator switch IS is closed and for preventing closing of the isolator switch IS when the ground switch contacts GC1-GC3 are closed. In particular, the ground switch comprises a first interlock device IX1 (sometimes referred to herein as the "isolator interlock device") and optionally also includes a second interlock device IX2 (sometimes referred to herein as the "key interlock device").

The first (isolator) interlock device IX1 comprises a first lock base or lock block B1 that is non-rotatably connected to the driven output gear GR3. As shown, the driven output gear GR3 is non-rotatably connected to an output shaft GR3X that is rotatably supported relative to the enclosure E, and the first lock block B1 is non-rotatably connected to the output shaft GR3X so as to rotate in unison with the output gear GR3. The first lock block B1 can be non-circular and comprise a plurality of flat surfaces. The first lock block B1 comprises a first lock recess RC1.

The first interlock device IX1 further comprises an interlock member such as an interlock member or interlock plunger LP1 that is connected to an isolation switch interlock linkage IXL that is operatively connected to the isolator switch handle IH. Due to the interlock linkage IXL, movement of the isolator switch handle IH from the first (off) position to the second (on) position induces movement of the interlock plunger LP1 in a first direction D1 toward the lock block B1 (downward in a typical installation) to a deployed or extended position as shown in FIGS. 3D & 3E. Conversely, the interlock linkage IXL causes the interlock plunger LP1 to move in a second direction D2, opposite the first direction D1, away from the lock block B1 (upward in a typically installation) to a stored or retracted position when the isolator switch handle IH is moved from its second (on) position toward its first (off) position as shown in FIG. 3A.

The first lock block B1 is conformed and dimensioned to block and prevent movement of the interlock plunger LP1 in the first direction D1 for all angular positions of the lock block B1 except when the lock recess RC1 is located in a select plunger receiving position where the lock recess RC1 is registered or aligned with the interlock plunger LP1. When the lock plunger LP1 is located in the first lock recess RC1, the isolator interlock device IX1 is in its "engaged" position where it prevents operation of the ground switch device GS and when the lock plunger LP1 is retracted and withdrawn from the lock recess RC1 the isolator interlock device IX1 is in its "disengaged" position where it allows operation of the ground switch device GS.

When the isolator interlock is disengaged and moved toward its engaged position, contact between the interlock plunger LP1 and the first lock block B1 blocks movement of the lock plunger LP1 in the first direction D1 which, in turn, blocks movement of the isolator handle to its "on" (conducting) position except when the lock recess RC1 is aligned with the lock plunger LP1. The first lock block B1 is keyed in a select angular position on the output shaft GR3X such that the lock recess RC1 is only located in the lock plunger receiving position where it is aligned with and open to receive the interlock plunger LP1 when the ground switch GS is located or arranged in its opened (non-conducting) position, i.e., when the ground contacts GC1-GC3 are open. Thus, when the lock recess RC1 is aligned with the interlock plunger LP1, the interlock plunger LP1 is able to move in the direction D1 into the lock recess RC1 (to engage the isolator interlock device IX1) which allows the isolator handle IH to move to its "on" (conducting) position. Furthermore, those of ordinary skill in the art will recognize that the lock recess RC1 is conformed and dimensioned to receive the interlock plunger LP1 therein in a manner such that, when the isolator interlock system IX1 is engaged, the interlock plunger LP1 abuts and prevents rotation of the lock block B1 and, consequently, also prevents rotation of the output gear GR3, main gear GR2, and ground shaft GSX when the interlock plunger LP1 is received and seated in the lock recess RC1. In this manner, the ground switch is restrained in its opened (non-conducting) state when the isolator handle IH is located in its second (on) position corresponding the closed (conducting) state of the isolator switch IS to prevent closing of the ground contacts GC1-GC3 when the isolator switch is in a conductive state. The interlock plunger LP1 is shown as being moved linearly in the first and second opposite directions D1,D2 by the interlock linkage IXL, but those of ordinary skill in the art will recognize that the interlock plunger can alternatively move along a non-linear path between its retracted and deployed positions.

The second (key) interlock device IX2 similarly comprises a second lock member or second lock block B2 that is non-rotatably connected to the input gear GR1. As shown, the input gear GR1 is non-rotatably connected to the input shaft GR1X that is rotatably supported relative to the enclosure E, and the second lock block B2 is non-rotatably connected to the input shaft GR1X so as to be non-rotatably coupled to and rotate in unison with the input gear GR1. The second lock block B2 can be non-circular and comprise a plurality of flat surfaces. The second lock block B2 comprises a second lock recess RC2 (see FIGS. 3E & 3F).

Figure 3F:
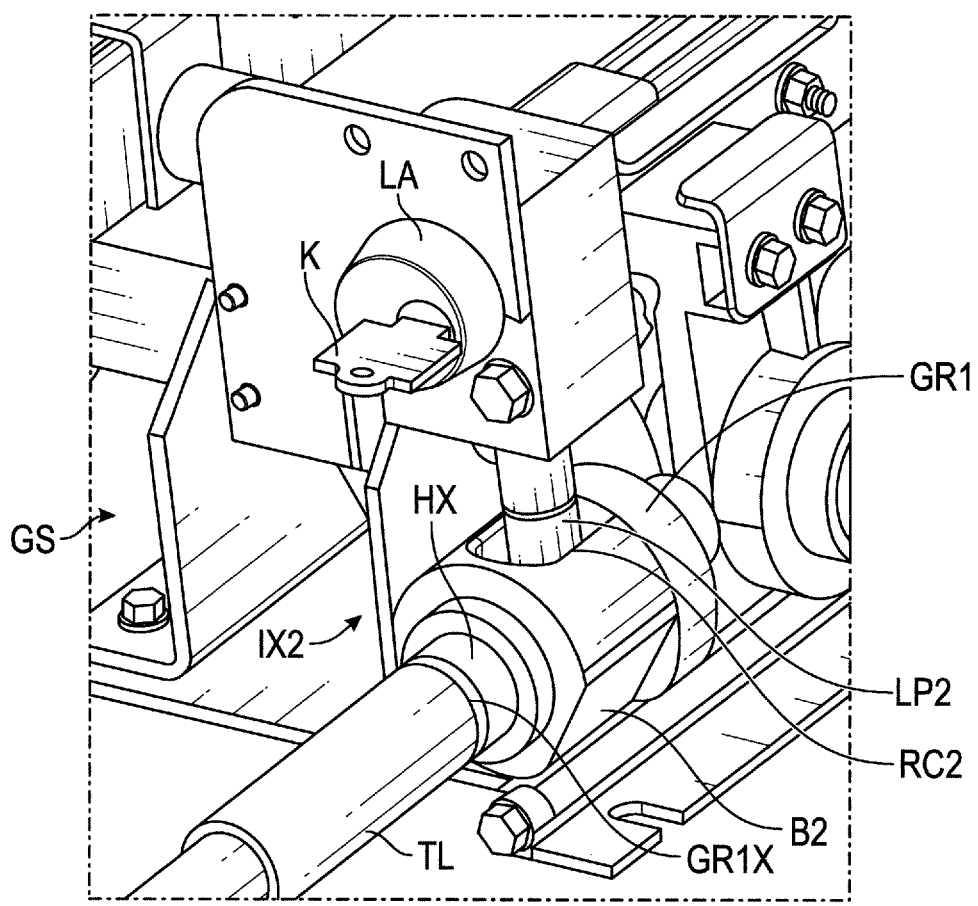
FIG. 3F in an enlarged view of the key interlock device of FIG. 3C in its locked (engaged) state.

The key interlock device IX2 further comprises an interlock member such as a keylock plunger or other lock member LP2 that is connected to a key-lock assembly LA that is operated with a removable key K. The lock assembly LA is secured to the enclosure E. When the key K is operably engaged in the lock assembly LA, rotational movement of the key K in a first direction from a first (unlocked) position to a second (locked) position induces movement of the lock member LP2 in an extension direction Z1 (FIG. 3C) toward the lock block B2 (downward in the illustrated embodiment) to a deployed or extended or "locked" position as shown in FIGS. 3E & 3F. Conversely, when the key K is rotated in a second opposite direction from the second (locked) position to the first (unlocked) position, the lock assembly LA induces movement of the lock member LP2 in a retraction direction Z2 (FIG. 3C), opposite the extension direction Z1, away from the lock block B2 (upward in the illustrated embodiment) to a retracted or "unlocked" position as shown in FIGS. 3A-3C. The second lock block B2 is conformed and dimensioned to be contacted by and to block and prevent movement of the lock member LP2 in the extension direction X1 direction Z1 into its extended position for all angular positions of the second lock block B2 except when the second lock recess RC2 thereof is located in a select plunger receiving position where the recess RC2 is registered or aligned with the lock member LP2. The second lock block B2 is keyed in a select angular position on the input shaft GR1X such that the second lock recess RC2 is only located in its receiving position where it is aligned with and open to receive the lock member LP2 when the ground switch GS in in its opened (non-conducting) position, i.e., when the ground contacts GC1-GC3 are open as shown in FIGS. 3E & 3F Furthermore, those of ordinary skill in the art will recognize that the lock recess RC2 is conformed and dimensioned to receive the lock member LP2 therein in a manner such that the lock member LP2 abuts and prevents rotation of the second lock block B2 and, consequently, also prevents rotation of the input gear GR1, main gear GR2, and ground shaft GSX when the lock member LP2 is received and seated in the lock recess RC2. In this manner, the ground switch GS is restrained in its opened (non-conducting) state when the lock assembly LA is positioned in its locked state. The lock member LP2 is shown as being moved linearly in the first and second opposite directions Z1,Z2 by the lock assembly LA, but those of ordinary skill in the art will recognize that the lock member LP2 can alternatively move along a non-linear path between its retracted and extended positions.

Figure 4:
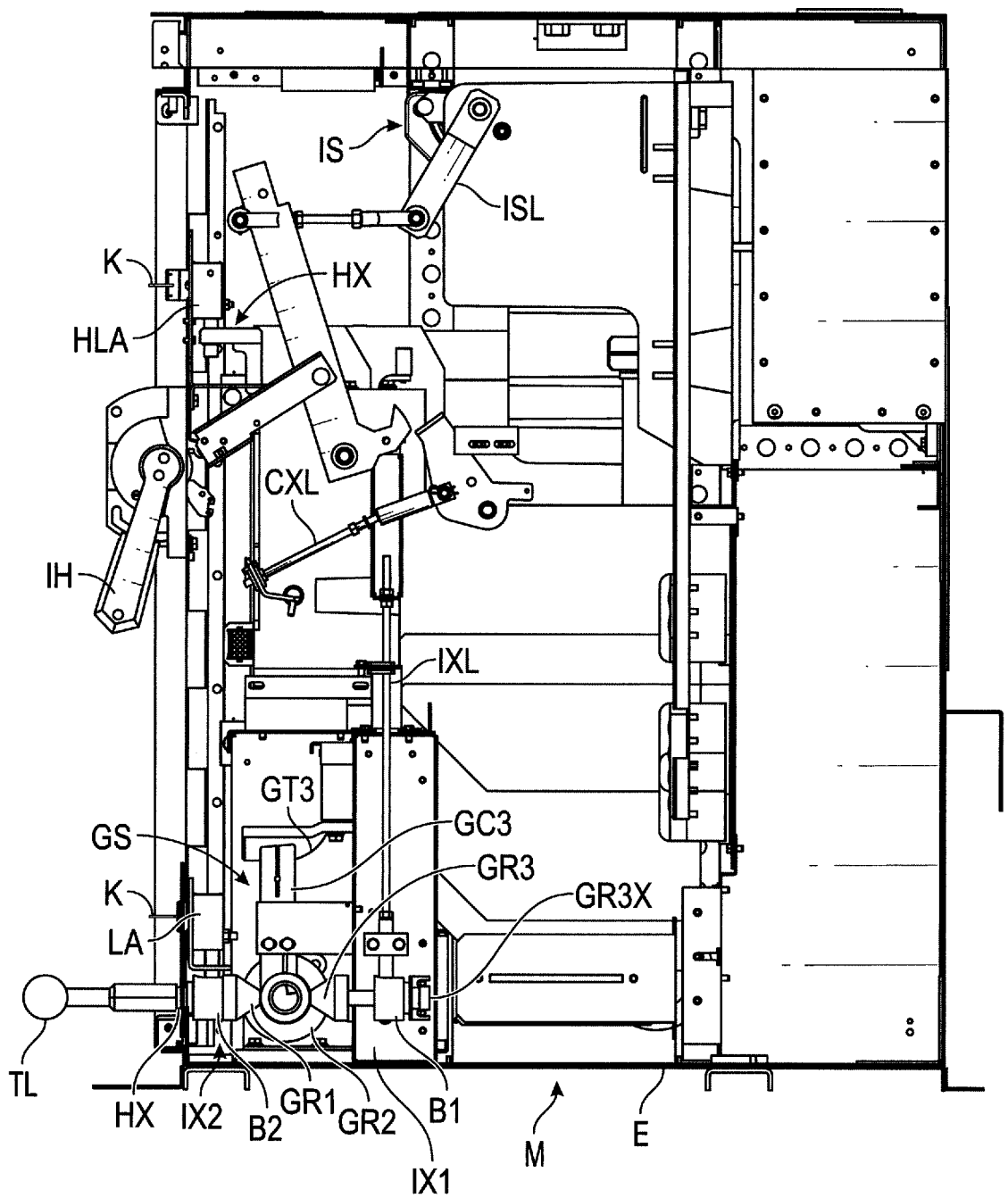
FIG. 4 is a partial side view of the motor control center of FIGS. 1 & 2 and shows that the integrated interlock system can optionally comprise both an isolator handle linkage ground switch interlock system and a shared-key ground switch interlock system.

The key K is trapped or captured in the lock assembly LA while the lock assembly LA is in its unlocked condition and can only be removed from the lock assembly LA when the lock assembly LA is in its locked condition. This allows the key K to be used in a shared-key interlock system where the same key K is used to operate first and second key interlock devices to ensure that only one of the key interlock devices is unlocked at any given time. FIG. 4 shows that the motor control center M can include the key interlock device IX2 as described above and also includes an isolator handle key interlock device HX including a handle lock assembly HLA that selectively locks the isolator handle IH in its "off" position when locked to prevent movement of the isolator handle IH to the "on" position when locked. The handle key interlock device HX uses the same single K as the ground switch key interlock device IX2 and the key K is captured in the handle interlock device HX when it is unlocked to ensure that the isolator handle IH is moved to and locked in its "off" position before the key K can be removed from the handle interlock device HX and inserted into the ground switch key interlock device IX2 to unlock the ground switch device GS to allow the ground switch device to be moved to its conductive or "on" state.

Figure 5:
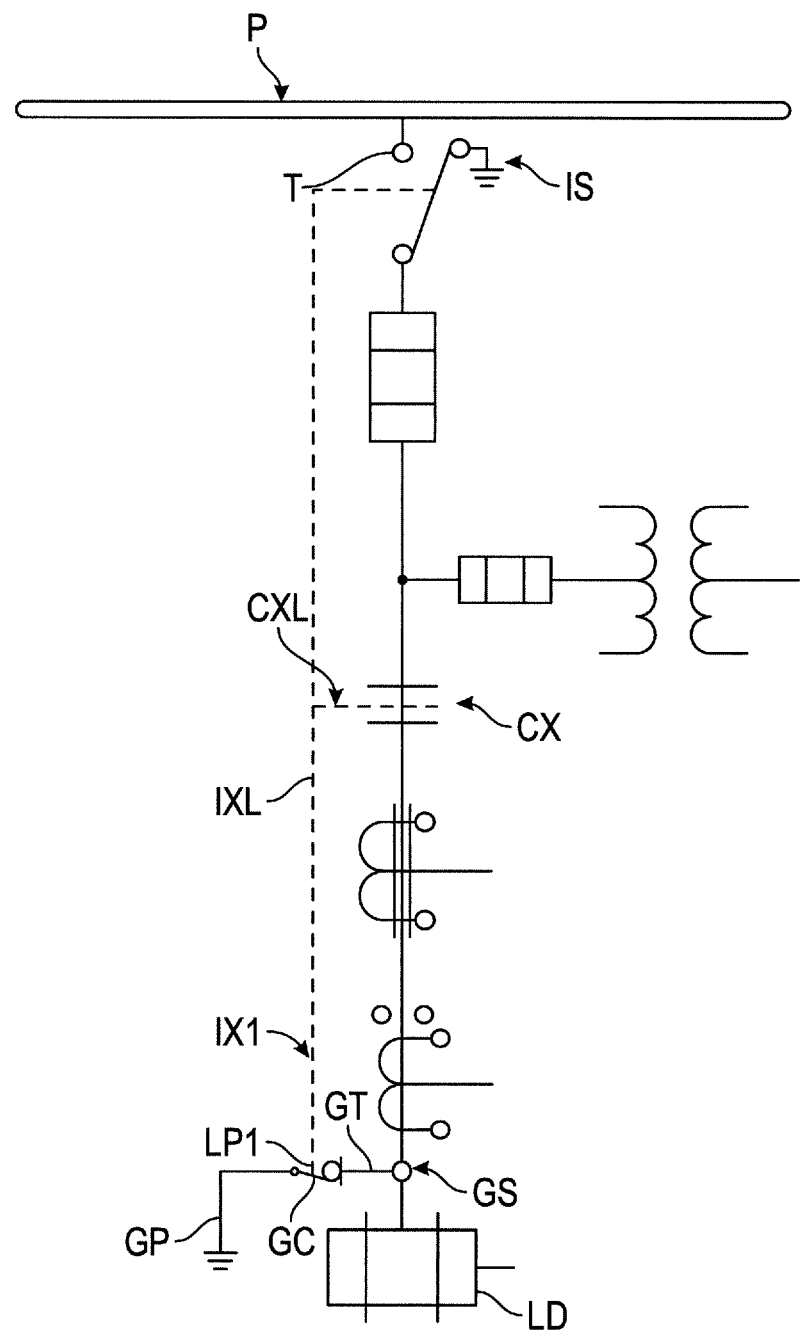
FIG. 5 is a schematic diagram that illustrates the integrated interlock system corresponding to FIGS. 1-3F.

Another advantage of a ground switch interlock system IK provided in accordance with an embodiment of the present development is that, unlike known systems, the ground switch device GS is located on the load-side of the main contactor CX, i.e., electrically between the motor or other associated load LD being powered by the motor control center M and the contactors X1-X3 of the main contactor CX. As shown in FIG. 5, the motor control center M is located electrically between the incoming source of electrical power P and the motor or other load LD. The isolation switch IS is selectively operable to connect or disconnect the main contactor CX from the electrical power source P. The ground switch interlock device IX1 operably interconnects the isolation switch IS and the ground switch device GS via interlock linkage IXL as described above. The isolator switch IS is electrically connected to the main contactor CX, and the main contactor CX is electrically connected on its downstream or output side to the load LD. The ground switch device GS is also located on the downstream or output side of the main contactor CX such that the ground switch contacts GC (GC1-GC3) are electrically located between the main contactor CX and the load LD. When the ground switch contacts GC of the ground switch device GS are closed, the ground path GP is connected between the load LD and the main contactor CX to safely ground or earth the main contactor CX and the load LD. This arrangement ensures that the load side of the main contactor CX is grounded when the ground switch device GS is in its closed (conductive) state.

FIG. 1 illustrates another main advantage of an embodiment of the present development. There, it can be seen that the ground switch contacts GC1-GC32 are vertically aligned respectively with the ground terminals GT1-GT3. In the case of three-phase AC power, the three ground terminals GT1-GT3 respectively associated with the three-phases of electrical power are horizontally spaced-apart from each other in a row. Likewise, the three ground switch contacts GC1-GC3 are horizontally spaced-apart from each other in a row and are vertically aligned respectively with the ground terminals GT1-GT3 such that each ground terminal GT1-GT3 lies in a common vertical reference plane with respect to its associated ground switch contact GC1-GC3 for all operative positions of the ground switch contact GC1-GC3. Thus, the three associated ground terminal/ground contact pairs GT1/GC1, GT2/GC2, and GT3/GC3 respectively lie in three parallel, spaced-apart vertical reference planes. This arrangement provides a simple and effective method for a human operator to quickly and safely assess the ground state (grounded or ungrounded) of each of the ground terminals GT1-GT3 by visual inspection in that the operator will be able to determine visually whether each ground terminal GT1-GT3 is engaged by its associated ground contact GC1-GC3 or not by viewing the ground switch device GS from the front as shown in FIG. 1, such as through an access opening or window defined in the enclosure E. The first, second, and third ground terminals GT1-GT3 and also the first, second, and third ground contacts GC1-GC3 are vertically aligned with and are thus visually associated with both the first, second, and third contactors X1-X3 and also with the first, second, and third power phases, respectively.

Figure 6:
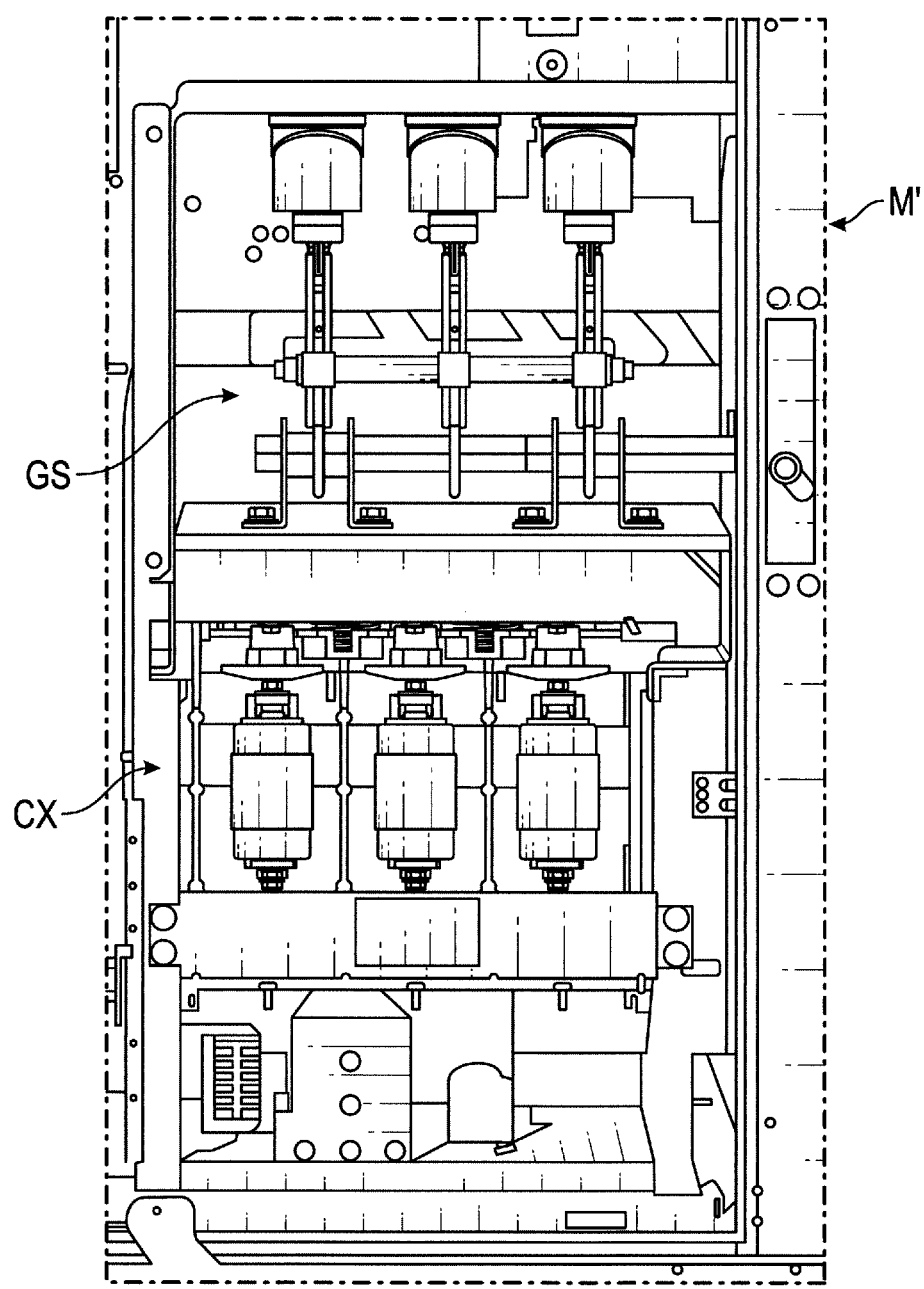
FIG. 6 shows a motor control center including the integrated ground switch interlock system in accordance with an alternative embodiment of the present development.

The physical position of the ground switch device GS relative to the main contactor CX can be altered such as by locating the ground switch device GS vertically above the main contactor CS as shown for the motor control center M' in FIG. 6 rather than vertically below the main contactor CX as shown in FIG. 1 (or the ground switch device GS can be located laterally adjacent the main contactor CX). In all cases, however, the ground switch device GS is electrically connected on the load side or output side of the main contactor CX as described above.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The following is claimed:

1. A motor control center comprising:
   an enclosure comprising an isolation switch, a main contactor device, and a ground switch device;

said isolation switch selectively manually operable between a connected state and a disconnected state, wherein said isolation switch in said connected state is adapted to conduct electrical power from an associated power source to said main contactor device and wherein said isolation switch in said disconnected state interrupts conduction of said electrical power from the associated power source to the main contactor device;

said main contactor device selectively operable between a conductive state and a non-conductive state, wherein said main contactor device is adapted to electrically connect said isolation switch to said ground switch device and to an associated electrical load when said main contactor device is in a conductive state and wherein said main contactor device disconnects said isolation switch from the ground switch device and the associated electrical load when said main contactor device is in a non-conductive state;

said ground switch device manually operable from an open, ungrounded state in which said main contactor device is electrically disconnected from a ground path to a closed, grounded state in which said main contactor device is electrically connected to said ground path; and said ground switch device comprising:

an isolator interlock device operably connected between said isolation switch and said ground switch device, wherein said isolator interlock device prevents movement of said isolation switch from said disconnected state to said connected state when said ground switch device is in said grounded state, and, a key interlock device configured to lock said ground switch device in said open, ungrounded state so that movement of said ground switch device to said grounded state is blocked.

2. The motor control center as set forth in claim 1, further comprising an isolation switch handle operably connected to said isolation switch and movable between an "off" position corresponding to said disconnected state of said isolation switch and an "on" position corresponding to said connected state of said isolation switch, wherein said isolator interlock device blocks movement of said isolation switch handle from said "off" position to said "on" position when said ground switch device is positioned in said grounded state.

3. The motor control center as set forth in claim 2, wherein said isolator interlock device prevents movement of said ground switch device from said ungrounded state to said grounded state when said isolation switch handle is located in said "on" position.

4. The motor control center as set forth in claim 3, wherein said isolation switch handle is operably connected to said isolation switch by a mechanical isolator switch linkage and wherein said isolator interlock device comprises a lock plunger operably connected to said isolation switch handle by an isolation switch interlock linkage.

5. The motor control center as set forth in claim 4, wherein:

said isolation switch interlock linkage moves said lock plunger to a retracted position when said isolation switch handle is located in said "off" position;

said isolation switch interlock linkage moves said lock plunger to an extended position when said isolation switch handle is located in said "on" position;

said ground switch device comprises at least one movable ground contact that moves between an opened position in said ungrounded state to a closed position in said grounded state; and, said lock plunger blocks movement of said at least one movable ground contact from said opened position to said closed position when said lock plunger is in said extended position.

6. The motor control center as set forth in claim 5, wherein said isolator interlock device comprises a first lock block that is contacted by said lock plunger and blocks movement of said lock plunger to said extended position when said lock plunger moves from said retracted position toward said extended position when said at least one movable ground contact is in said closed position.

7. The motor control center as set forth in claim 6, wherein said first lock block blocks movement of at least one movable ground contact from said opened position to said closed position when said lock plunger is in said extended position.

8. The motor control center as set forth in claim 7, wherein said first lock block comprises a first lock recess located in said first lock block, wherein said lock plunger is seated in said first lock recess when said lock plunger is in said extended position and said at least one movable ground contact is in said closed position.

9. The motor control central as set forth in claim 8, wherein said at least one movable ground contact is connected to a rotatable ground shaft that is electrically connected to said ground path, said ground switch device comprising a main gear connected to said ground shaft and an output gear engaged with said main gear;

wherein said first lock block is non-rotatably coupled with said output gear such that rotation of said ground shaft alters an angular position of said first lock block; and, wherein said first lock block is located in a select angular position in which said first lock recess is aligned with said lock plunger when said ground shaft is rotated to a position corresponding to said closed position of said at least one movable ground contact.

10. The motor control center as set forth in claim 9, further comprising an input gear engaged with said main gear, wherein said input gear is non-rotatably connected to a torque input head that is selectively manually rotatable to rotate said input gear, said main gear, and said output gear.

11. The motor control center as set forth in claim 10, wherein the key interlock device comprises a first key interlock device operable by a key between a locked state and an unlocked state, wherein said first key interlock device blocks rotation of said input gear when said first key interlock device is in said locked state.

12. The motor control center as set forth in claim 11, wherein the key interlock device further comprises a second key interlock device operable by said key between a locked state and an unlocked state, wherein said second key interlock device selectively blocks movement of said isolation switch handle when said second key interlock device is in said locked state, wherein:

said key that operates said first and second key interlocks is a single, common key;

when one of the first and second key interlock devices is in said respective locked state, another one of the first and second key interlock devices is in in said respective unlocked state; and, said key is captured in said another one of said first and second key interlock devices that is in said respective unlocked state such that said another one of said first and second key interlock devices must be moved to said respective locked state before said key is removed for use in moving said one of said first and second key interlock devices from said respective locked state to said respective unlocked state.

13. The motor control center as set forth in claim 12, wherein the first key interlock device further comprises a second lock block non-rotatably coupled to said input gear, and a lock member that engages and prevents rotation of said second lock block when said lock member is in an extended position and said ground switch device is in said open, ungrounded state.

14. The motor control center as set forth in claim 5, wherein said ground switch device is located on a load side of said main contactor device.

15. The motor control center as set forth in claim 14, wherein said ground switch device further comprises: first, second, and third ground terminals electrically connected to respective first, second, and third electrical phases of said main contactor device;
said at least one moveable ground contact comprises first, second, and third ground contacts that respectively contact said first, second, and third ground terminals when said first, second, and third ground contacts are in said respective closed positions.

16. The motor control center as set forth in claim 15, wherein said first, second, and third ground terminals are respectively vertically aligned with said first, second, and third ground contacts.

17. The motor control center as set forth in claim 16, wherein: said ground switch device is located vertically above or vertically below said main contactor device;
said main contactor device comprises first, second, and third contactors electrically connected respectively to said first, second, and third ground terminals; and,
said first, second, and third ground terminals are horizontally spaced-apart from each other in a row so that said first, second, and third ground terminals are visually associated with said first, second, and third contactors, respectively.

18. A motor control center comprising:
an enclosure comprising an isolation switch, a main contactor device, and a ground switch device;
said isolation switch selectively manually operable between a connected state and a disconnected state, wherein said isolation switch in said connected state is adapted to conduct electrical power from an associated power source to said main contactor device and wherein said isolation switch in said disconnected state interrupts conduction of said electrical power from the associated power source to the main contactor device;
an isolation switch handle operably connected to said isolation switch by a mechanical isolator switch linkage and movable between an "off" position corresponding to said disconnected state of said isolation switch and an "on" position corresponding to said connected state of said isolation switch;
said main contactor device selectively operable between a conductive state and a non-conductive state, wherein said main contactor device is adapted to electrically connect said isolation switch to said ground switch device and to an associated electrical load when said main contactor device is in a conductive state and wherein said main contactor device disconnects said isolation switch from the ground switch device and the associated electrical load when said main contactor device is in a non-conductive state;
said ground switch device manually operable from an open, ungrounded state in which said main contactor device is electrically disconnected from a ground path to a closed, grounded state in which said main contactor device is electrically connected to said ground path;
said ground switch device comprising an isolator interlock device operably connected between said isolation switch and said ground switch device, wherein: said isolator interlock device: (i) prevents movement of said isolation switch handle from said "off" position to said "on" position and prevents movement of said isolation switch from said disconnected state to said connected state when said ground switch device is in said grounded state; and (ii) prevents movement of said ground switch device from said ungrounded state to said grounded state when said isolation switch handle is located in said "on" position;
wherein said isolator interlock device comprises a lock plunger operably connected to said isolation switch handle by an isolation switch interlock linkage, and wherein: (i) said isolation switch interlock linkage moves said lock plunger to a retracted position when said isolation switch handle is located in said "off" position; (ii) said isolation switch interlock linkage moves said lock plunger to an extended position when said isolation switch handle is located in said "on" position; (iii) said ground switch device comprises at least one movable ground contact that moves between an opened position in said ungrounded state to a closed position in said grounded state; and, (iv) said lock plunger blocks movement of said at least one movable ground contact from said opened position to said closed position when said lock plunger is in said extended position.

19. The motor control center as set forth in claim 18, wherein said isolator interlock device comprises a first lock block that is contacted by said lock plunger and blocks movement of said lock plunger to said extended position when said lock plunger moves from said retracted position toward said extended position when said at least one movable ground contact is in said closed position.

20. The motor control center as set forth in claim 19, wherein said first lock block blocks movement of at least one movable ground contact from said opened position to said closed position when said lock plunger is in said extended position.

* * * * *